(12) United States Patent
Watanabe (10) Patent No.: US 8,949,274 B2
(45) Date of Patent: Feb. 3, 2015

(54) DATA MIGRATION APPARATUS FOR MITIGATING DATA BETWEEN DOCUMENT MANAGEMENT SYSTEMS

(71) Applicant: Canon Kabushiki Kaisha, Tokyo (JP)

(72) Inventor: Ryutaro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 13/693,822

(22) Filed: Dec. 4, 2012

(65) Prior Publication Data

US 2013/0144911 A1 Jun. 6, 2013

(30) Foreign Application Priority Data

Dec. 6, 2011 (JP) ................................. 2011-266746

(51) Int. Cl.
*G06F 17/30* (2006.01)
*G06F 21/60* (2013.01)

(52) U.S. Cl.
CPC ........ *G06F 17/30079* (2013.01); *G06F 21/604* (2013.01)
USPC .............................. 707/783; 707/829; 726/27

(58) Field of Classification Search
CPC .................... G06F 17/30067; G06F 17/30079; G06F 17/30091; G06F 17/30011; G06F 17/3089; G06F 17/211; G06F 19/322; G06F 21/604; G06F 17/303; G06F 17/3009; G06F 17/30069; G06F 17/30171; G06Q 50/00
USPC ................. 707/704, 783, 785, 786, 821, 829, 707/999.009, 781, 788; 726/27, 30; 709/213, 217; 715/229

See application file for complete search history.

(56) References Cited

U.S. PATENT DOCUMENTS

| 7,146,367 | B2 * | 12/2006 | Shutt | 709/217 |
|---|---|---|---|---|
| 8,499,006 | B2 * | 7/2013 | Okabe | 707/786 |
| 2006/0129654 | A1 * | 6/2006 | Sato | 709/213 |
| 2012/0137360 | A1 * | 5/2012 | Henderson | 726/17 |

FOREIGN PATENT DOCUMENTS

JP 2007-172041 A 7/2007

* cited by examiner

*Primary Examiner* — Greta Robinson
(74) *Attorney, Agent, or Firm* — Canon USA, Inc., IP Division (57) ABSTRACT

A data migration apparatus, which migrates data from a first document management system capable of setting an access right in document units to a second document management system incapable of setting an access right in document units and capable of setting an access right in folder units, includes a determination unit configured to determine whether an access right to document data of a document to be migrated inherits an access right to a higher-level folder or is unique to the document, a sub-folder creation unit configured to create a sub-folder to which a same access right as that unique to the document is set at a migration destination, if the determination unit determines that the access right to the document data is unique to the document, and a document storage unit configured to store the document data to be migrated in the sub-folder created by the sub-folder creation unit.

14 Claims, 10 Drawing Sheets

| FOLDER & FILE CONFIGURATION | ACCESS RIGHT |
|---|---|
| TEAM | Everyone(EDIT) |
| ├ SPECIFICATIONS | INHERIT ACCESS RIGHT TO HIGHER-LEVEL FOLDER |
| │ └ NOTE.txt | INHERIT ACCESS RIGHT TO HIGHER-LEVEL FOLDER |
| └ PROJECT MANAGEMENT | Everyone(VIEW)   Administrators(EDIT) |
| ├ SCHEDULE.xls | INHERIT ACCESS RIGHT TO HIGHER-LEVEL FOLDER |
| └ PROGRESS.xls | Everyone(EDIT) |

FIG. 3

| ID | TYPE | PATH | NAME | INHERITANCE | ACCESS RIGHT |
|----|------|------|------|-------------|--------------|
| 1 | FOLDER | ¥ | TEAM | UNIQUE | Everyone = EDIT |
| 2 | FOLDER | ¥TEAM | SPECIFICATIONS | INHERITANCE | - |
| 3 | DOCUMENT | ¥TEAM¥SPECIFICATIONS | NOTE.txt | INHERITANCE | - |
| 4 | FOLDER | ¥TEAM | PROJECT MANAGEMENT | UNIQUE | Everyone = VIEW; Administrators = EDIT |
| 5 | DOCUMENT | ¥TEAM¥PROJECT MANAGEMENT | SCHEDULE.xls | INHERITANCE | - |
| 6 | DOCUMENT | ¥TEAM¥PROJECT MANAGEMENT | PROGRESS.xls | UNIQUE | Everyone = EDIT |

| FOLDER & FILE CONFIGURATION | ACCESS RIGHT |
|---|---|
| TEAM | Everyone(EDIT) |
| ├ SPECIFICATIONS | INHERIT ACCESS RIGHT TO HIGHER-LEVEL FOLDER |
| │ └ NOTE.txt | INHERIT ACCESS RIGHT TO HIGHER-LEVEL FOLDER Administrators(EDIT) |
| └ PROJECT MANAGEMENT | Everyone(VIEW) |
| ├ PROGRESS.xls | Everyone(EDIT) |
| │ └ PROGRESS.xls | INHERIT ACCESS RIGHT TO HIGHER-LEVEL FOLDER |
| └ SCHEDULE.xls | INHERIT ACCESS RIGHT TO HIGHER-LEVEL FOLDER |

FIG. 7

| FOLDER & FILE CONFIGURATION | ACCESS RIGHT |
|---|---|
| 📁 PROJECT MANAGEMENT | Everyone(VIEW) Administrators(EDIT) |
| ├ 📄 SCHEDULE.xls | INHERIT ACCESS RIGHT TO HIGHER-LEVEL FOLDER |
| ├ 📄 AI.xls | Everyone(EDIT) |
| ├ 📄 FAILURE TRANSITION.xls | Everyone(EDIT) |
| └ 📄 PROGRESS.xls | Everyone(EDIT) |

| FOLDER & FILE CONFIGURATION | ACCESS RIGHT |
|---|---|
| PROJECT MANAGEMENT | |
| ├ Everyone(EDIT) | Everyone(VIEW) Administrators(EDIT) Everyone(EDIT) |
| │ ├ A1.xls | INHERIT ACCESS RIGHT TO HIGHER-LEVEL FOLDER |
| │ ├ FAILURE TRANSITION.xls | INHERIT ACCESS RIGHT TO HIGHER-LEVEL FOLDER |
| │ └ PROGRESS.xls | INHERIT ACCESS RIGHT TO HIGHER-LEVEL FOLDER |
| ├ SCHEDULE.xls | INHERIT ACCESS RIGHT TO HIGHER-LEVEL FOLDER |
| ├ SHORTCUT TO A1.xls | ACCESS RIGHT CORRESPONDS TO SHORTCUT-LINKED DESTINATION |
| ├ SHORTCUT TO FAILURE TRANSITION.xls | ACCESS RIGHT CORRESPONDS TO SHORTCUT-LINKED DESTINATION |
| └ SHORTCUT TO PROGRESS.xls | ACCESS RIGHT CORRESPONDS TO SHORTCUT-LINKED DESTINATION |

FIG. 10

| FOLDER & FILE CONFIGURATION | ACCESS RIGHT |
|---|---|
| PROJECT MANAGEMENT | Everyone(VIEW) Administrators(EDIT) |
| ├ A1.xls | Everyone(EDIT) |
| │  └ A1.xls | INHERIT ACCESS RIGHT TO HIGHER-LEVEL FOLDER |
| ├ FAILURE TRANSITION.xls | Everyone(EDIT) |
| │  └ FAILURE TRANSITION.xls | INHERIT ACCESS RIGHT TO HIGHER-LEVEL FOLDER |
| ├ PROGRESS.xls | Everyone(EDIT) |
| │  └ PROGRESS.xls | INHERIT ACCESS RIGHT TO HIGHER-LEVEL FOLDER |
| └ SCHEDULE.xls | ACCESS RIGHT CORRESPONDS TO SHORTCUT-LINKED DESTINATION |

DATA MIGRATION APPARATUS FOR MITIGATING DATA BETWEEN DOCUMENT MANAGEMENT SYSTEMS

CROSS REFERENCE OF RELATED APPLICATIONS

This application claims the benefit of Japanese Patent Application No. 2011-266746 filed Dec. 6, 2011, which is hereby incorporated by reference herein in its entirety.

BACKGROUND OF THE INVENTION

1. Field of the Invention

The present invention relates to a technique for migrating data between systems different in setting unit of an access right.

2. Description of the Related Art

A document management system can set an access right, by which "who" can execute "which operation," to a folder and a document. However, setting an access right individually to all folders and documents requires thousands of man-hours to make settings thereof and subsequent maintenance. Therefore, it is generally able to "inherit an access right to a parent folder." In other words, in many cases, the access right to the parent folder is basically inherited, and a unique access right is set only to a document and a folder to which a specific access right, not inheriting the access right to the parent folder, is desired to be set.

On the other hand, it has been very difficult to continue to use the same document management system for a long period because of advances in computer technology accelerating year by year or changes in business configuration. In other words, data need to be migrated to a new document management system to satisfy a new functional requirement. However, in a different document management system, a method for setting security is sometimes different. For this reason, in migration to the new document management system, it is problematic how a difference in security settings according to access rights between environments before and after migration can be reduced. Japanese Patent Application Laid-Open No. 2007-172041 discusses a technique in which, if an inappropriate access right is to be provided after the migration of data, a new folder with an appropriate access right is created to store a document, thereby preventing such an inappropriate access right from being provided.

However, the technique discussed in Japanese Patent Application Laid-Open No. 2007-172041 might provide a folder with an access right that is contrary to a user's intention because a folder with a wide range of access right is automatically created. In addition, since the technique is premised on a system in which the same access right is provided to the migration source and destination, a problem is caused that, if the setting unit of the access right in the document management system at the migration destination is larger than that in the document management system at the migration source, such a migration technique cannot be used.

SUMMARY OF THE INVENTION

According to an aspect of the present invention, a data migration apparatus, which migrates data from a first document management system capable of setting an access right in document units to a second document management system incapable of setting an access right in document units and capable of setting an access right in folder units, includes a determination unit configured to determine whether an access right to document data of a document to be migrated inherits an access right to a higher-level folder or is unique to the document, a sub-folder creation unit configured to create a sub-folder to which a same access right as the access right unique to the document is set at a migration destination, if the determination unit determines that the access right to the document data is unique to the document, and a document storage unit configured to store the document data to be migrated in the sub-folder created by the sub-folder creation unit.

According to another aspect of the present invention, a data migration apparatus, which migrates data from a first document management system capable of setting an access right in document units to a second document management system incapable of setting an access right in document units and capable of setting an access right in folder units, includes a determination unit configured to determine whether an access right to document data of a document to be migrated inherits an access right to a higher-level folder or is unique to the document, a sub-folder determination unit configured to determine whether a sub-folder to which the same access right as the access right unique to the document is set exists in a migration destination, if the determination unit determines that the access right to the document data is unique to the document, a sub-folder creation unit configured to create a sub-folder to which the same access right as the access right unique to the document is set at the migration destination, if the sub-folder determination unit determines that the sub-folder does not exist at the migration destination, and a document storage unit configured to store the document data to be migrated in the sub-folder created by the sub-folder creation unit if the sub-folder determination unit determines that the sub-folder does not exist at the migration destination, and to store the document data to be migrated in the existing sub-folder if the sub-folder determination unit determines that the sub-folder exists at the migration destination.

According to an exemplary embodiment of the present invention, even if data are migrated from the document management system capable of setting the access right in document units to the document management system capable of setting the access right only in folder units, an access management similar to that of the migration source can be realized in the document management system at the migration destination.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In a first exemplary embodiment of the present invention, in a case where document data, to which an access right unique to a migration-source document management system is set, is migrated, a sub-folder with the same access right is created in a migration-destination document management system and the document data are stored in the created sub-folder.

Figure 1:
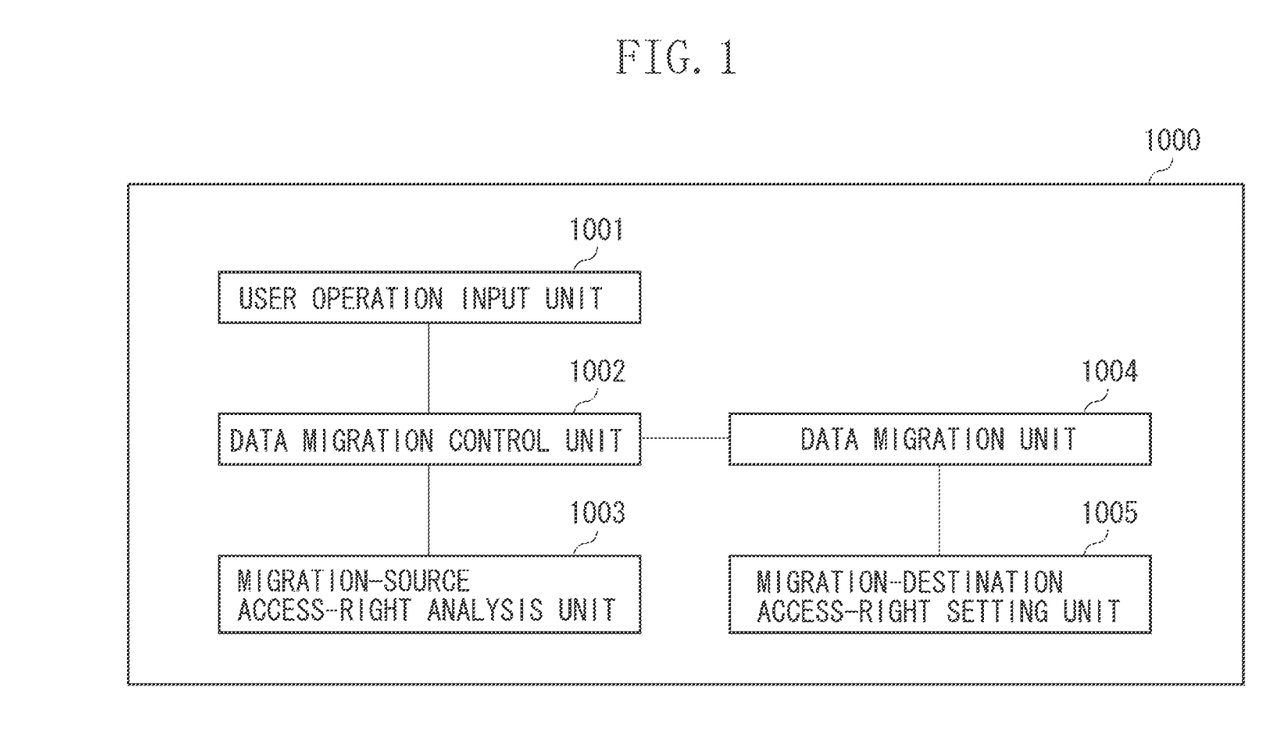
FIG. 1 illustrates a system configuration according to a first exemplary embodiment of the present invention.

FIG. 1 illustrates a configuration diagram of a data migration system (data migration apparatus) according to the present exemplary embodiment. The system is realized by using a computer or a navigation system including a central processing unit (CPU), a random access memory (RAM), a read only memory (ROM), and a hard disk drive (HDD). A computer program stored in a computer readable storage medium (any of the RAM, ROM, and HDD) is executed by the CPU to cause the computer to function as each processor illustrated in FIG. 1. The computer executes each process illustrated in a flow chart described below.

A user operation input unit 1001 receives an operation instruction input from the user via a user interface (UI) and transmits the content of the user operation to a data migration control unit 1002.

The data migration control unit 1002 migrates data based on the user operation received from the user operation input unit 1001 in collaboration with a migration-source access-right analysis unit 1003 and a data migration unit 1004.

The migration-source access-right analysis unit 1003 analyzes the access right set in the migration-source document management system in accordance with the instruction of the data migration control unit 1002.

The data migration unit 1004 migrates data to the migration-destination document management system in accordance with the analysis result of the migration-source access-right analysis unit 1003 and the instruction of the data migration control unit 1002 and instructs a migration-destination access-right setting unit 1005 to set an appropriate access right.

The migration-destination access-right setting unit 1005 sets an access right appropriate for data in the migration-destination document management system in accordance with the instruction of the data migration unit 1004.

Before the present exemplary embodiment is described, the flow of a data migration process in a case where an existing data migration method is used and problems thereof are described with reference to FIGS. 2 to 4.

Figure 2:
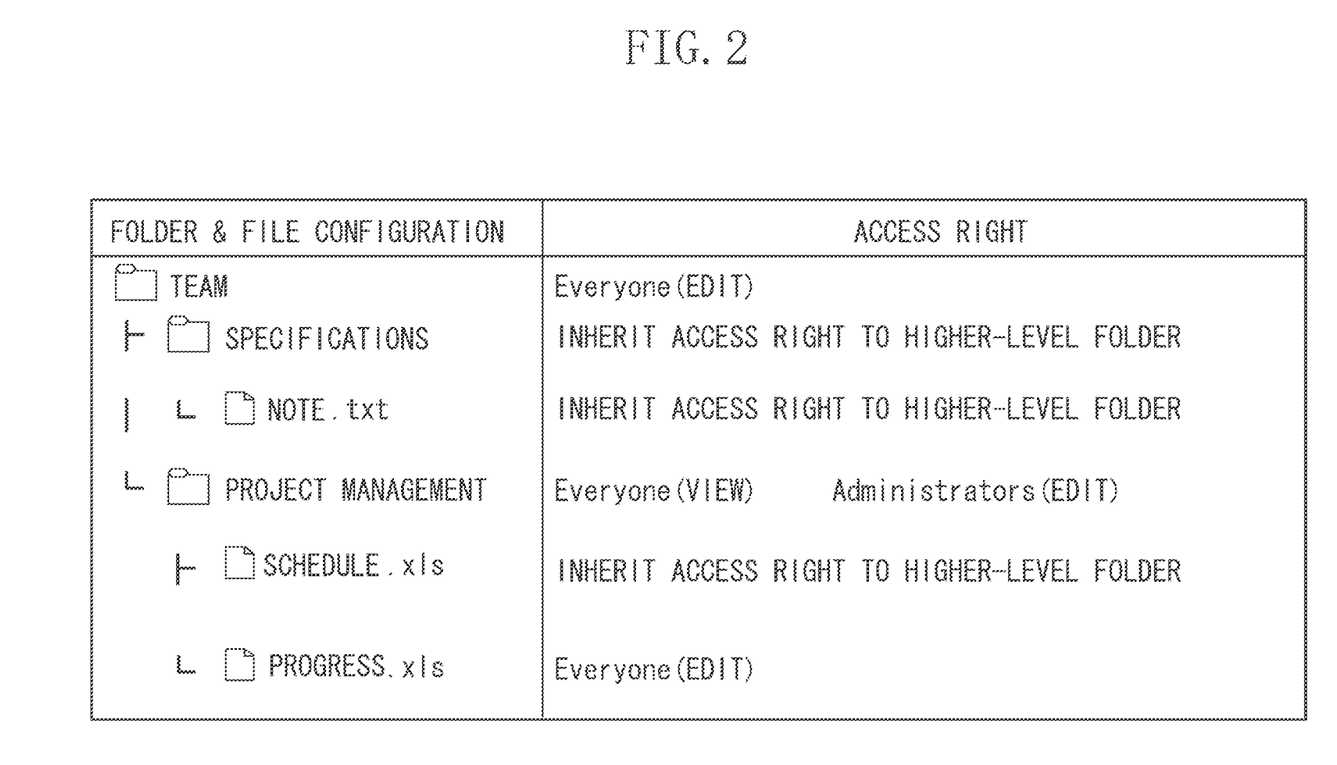
FIG. 2 illustrates an example of data at a migration source according to an existing technique.
Figure 3:
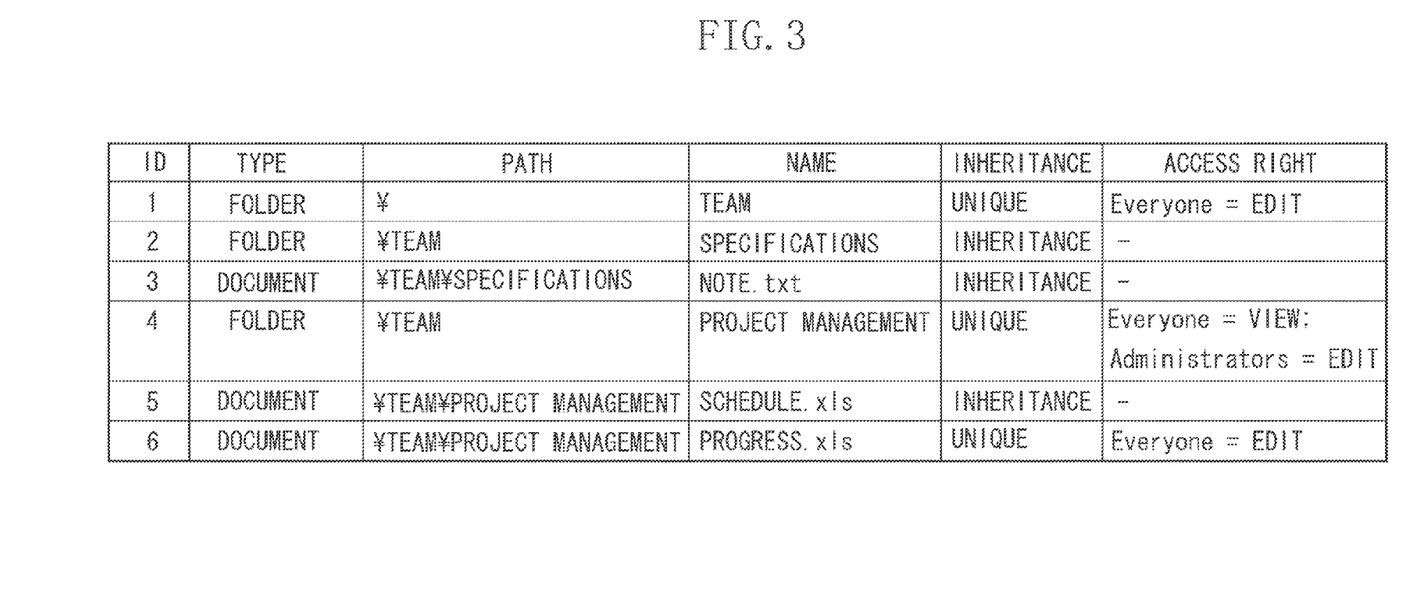
FIG. 3 illustrates an example of intermediate data of the data to be migrated according to the existing technique.

FIG. 2 indicates items (folders and files) to be migrated in the migration-source document management system and access rights set to each item. In the uppermost "team" folder, an "Everyone" group is provided with edit authority. A "specifications" folder in a lower layer of the uppermost folder is provided with a setting for inheriting the access right to the higher-level folder (i.e., the same access right as that of the higher-level folder). A "note.txt" document in the "specifications" folder is also provided with the setting for inheriting the access right to the higher-level folder. A "project management" folder in another lower layer of the uppermost "team" folder is provided with a setting different from that in the higher-level folder (i.e., a unique access right in which the "Everyone" group is provided with a view right and an Administrators group is provided with an edit right). A "schedule.xls" document in the "project management" folder inherits the access right to the higher-level folder, but a "progress.xls" document is provided with a setting different from that in the higher-level folder (the "Everyone" group is provided with the edit right).

In an existing data migration system, data to be migrated are replaced with intermediate data and then the intermediate data are migrated to a migration destination for easily conducting a data migration process between various document management systems. FIG. 3 illustrates an example of the intermediate data. FIG. 3 illustrates a table in which items to be migrated correspond to the access right thereof. For example, a row of ID 3 indicates that the "note.txt" document is stored in a folder in the hierarchy of "¥team¥specifications" and inherits the access right to the higher-level folder. Similarly, a row of ID 6 indicates that the "progress.xls" document is stored in a folder in the hierarchy of "¥team¥project management" and has a unique access right different from that of the higher-level folder, in which "the "Everyone" group has a unique edit right." The entity of document data to be migrated corresponds to ID and is separately managed.

In a case where data are instructed to migrate based on the intermediate data, the user operation input unit 1001 receives a migration instruction from the user and the intermediate data to be migrated. The user operation input unit 1001 receiving the intermediate data delivers the intermediate data to the data migration control unit 1002 and instructs the data migration control unit 1002 to migrate the data. The data migration control unit 1002 instructed to migrate the data analyzes the intermediate data at the migration-source access-right analysis unit 1003 to analyze the access right, which has been set in the migration-source document management system. The data migration control unit 1002 delivers information about the analyzed access right, data to be migrated, and a path of the data to the data migration unit 1004 and instructs the data migration unit 1004 to migrate the data.

Figure 4:
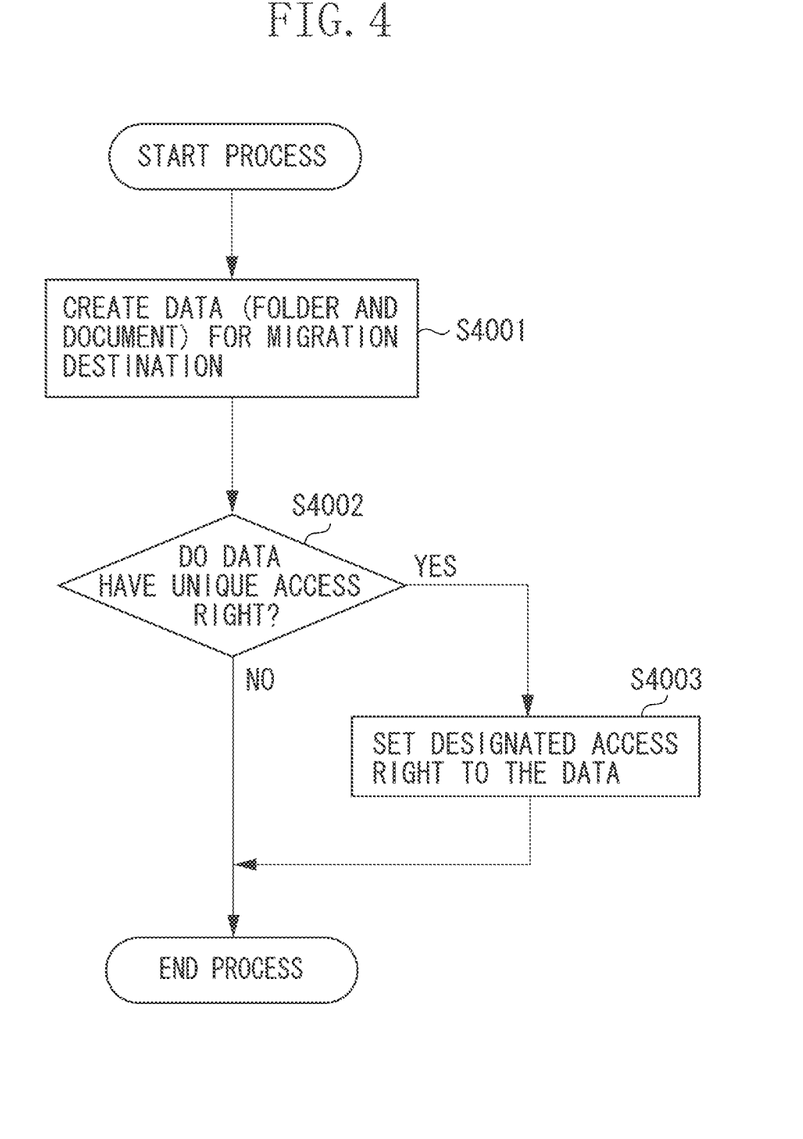
FIG. 4 is a flow chart of data migration according to the existing technique.

The data migration unit 1004 migrates the data and sets the access right according to the delivered information and a flow chart in FIG. 4. In step S4001, the data migration unit 1004 arranges the data designated as being migrated in a migration-destination path. The term "data" refers to a folder or a document to be migrated. In step 4002, the data migration unit 1004 determines whether the data to be migrated have a unique access right or inherit the access right to the higher-level folder based on the delivered information about the access right. If the data inherit the access right to the higher-level folder (NO in step 4002), the data are regarded as inheriting the access right to the higher-level folder, and the process is ended without changing the default access right. If the data migration unit 1004 determines that the data have a unique access right (YES in step 4002), then in step 4003, the data migration unit 1004 sets the designated access right to the data, and the process is ended.

In the migration-source document management system, an access right can be set in document units. If, in the migration-destination document management system, an access right cannot be set in document units and can be set only in folder units, the access right cannot be migrated as is, by the method of the above-mentioned data migration system. In such a case, there is no alternative but to change the access right to the document at the migration-destination source by inheriting the access right to the higher-level folder or to end the data migration process with an error.

The flow of the data migration process in the present exemplary embodiment is described below. The process according to the present invention is described below in which document data are migrated from the migration-source document management system capable of setting an access right in document units to the migration-destination document management system incapable of setting an access right in document units and capable of setting an access right in folder units. Also in a case where a document with a unique access right is migrated to the document management system capable of setting an access right only in folder units, the flow, in which the data migration control unit 1002 delivers information about the analyzed access right, data to be migrated, and a path of the data to the data migration unit 1004 and instructs the data migration unit 1004 to migrate the data, is similar to that of the above description. The data migration unit 1004 migrates the data and sets the access right according to the delivered information and a flow chart in FIG. 5.

Figure 5:
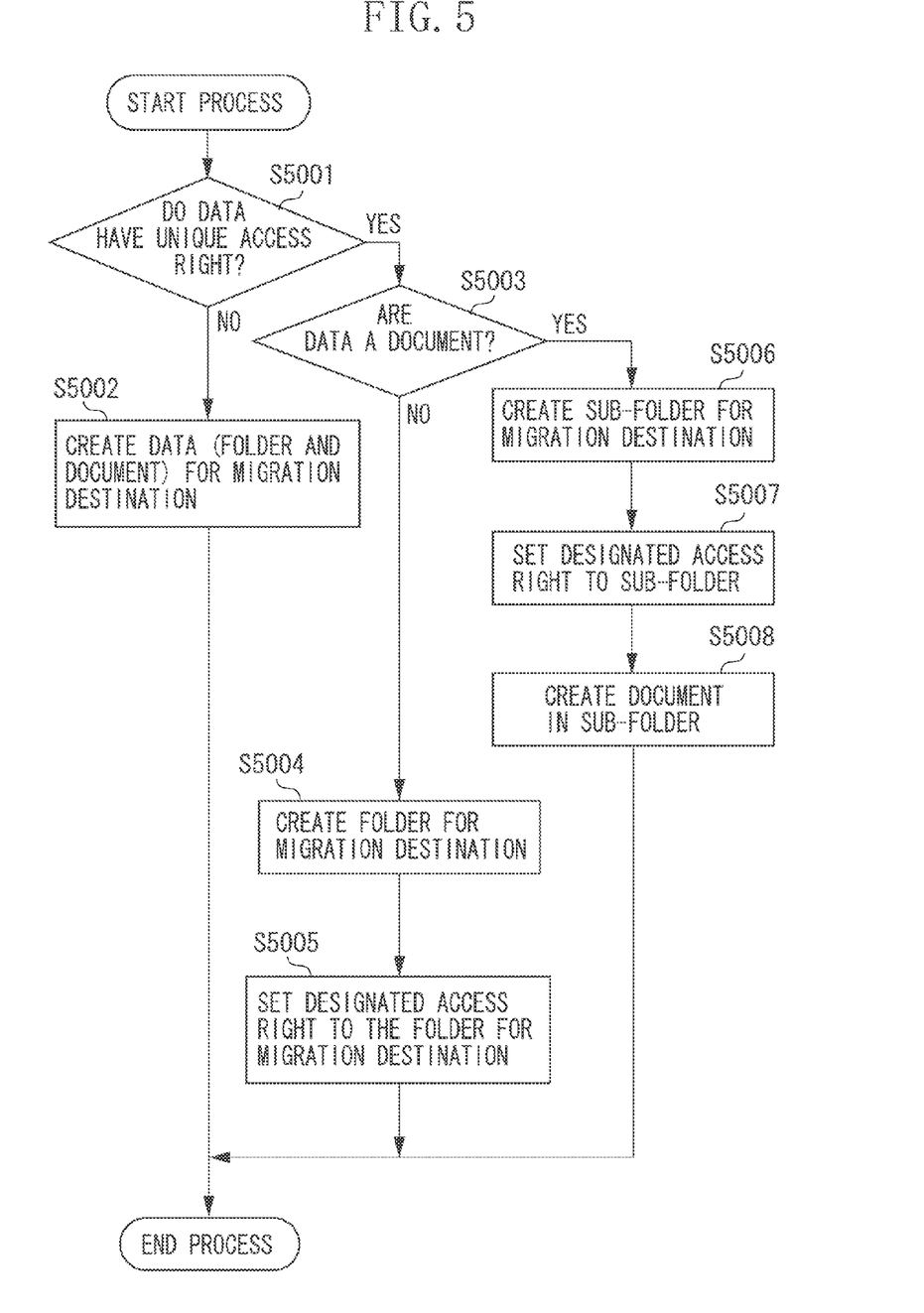
FIG. 5 is a flow chart of data migration according to a first exemplary embodiment.

In step 5001 in FIG. 5, the data migration unit 1004 determines whether the data to be migrated have a unique access right or inherit the access right to the higher-level folder based on the delivered information about the access right.

If the data migration unit 1004 determines that the data inherit the access right to the higher-level folder (NO in step 5001), then in step 5002, the data (document or folder) to be migrated are arranged in the designated path at the migration destination, and the process is ended.

If the data migration unit 1004 determines that the data to be migrated have a unique access right (YES in step 5001), the processing proceeds to step 5003, and the data migration unit 1004 determines whether the data to be migrated are a document or a folder.

If the data migration unit 1004 determines that the data to be migrated are a folder (NO in step 5003), the processing proceeds to step 5004, and the data migration unit 1004 creates a folder having the same name as the folder in the designated path at the migration destination. In step 5005, the designated access right is set to the created folder, and the processing is ended.

If the data migration unit 1004 determines that the data to be migrated are a document (YES in step 5003), the processing proceeds to step 5006 and the data migration unit 1004 creates a sub-folder in the designated path at the migration destination based on the name of the document to be migrated. In step 5007, the designated access right is set to the created sub-folder. In step 5008, the document data to be migrated are arranged in the created sub-folder, and the processing is ended.

Figure 6:
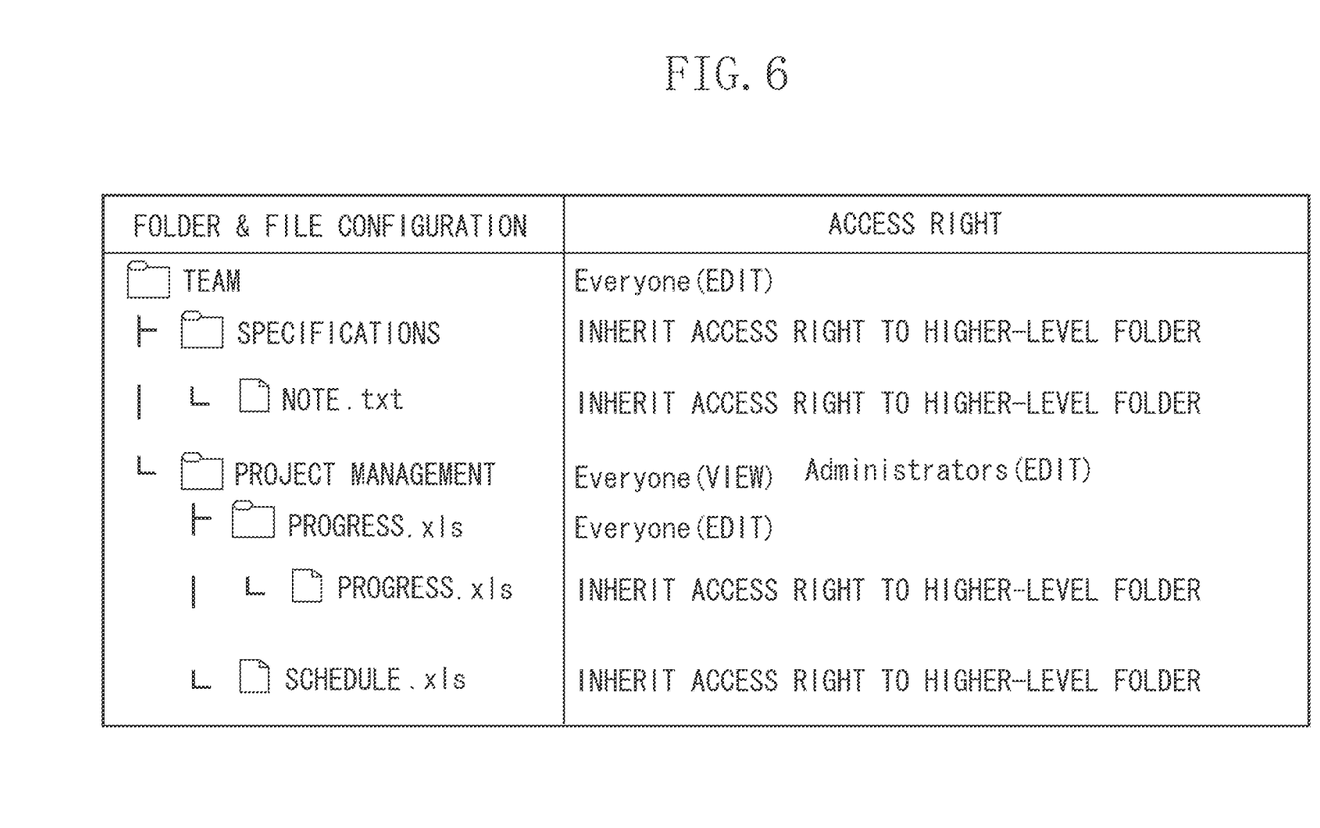
FIG. 6 illustrates an example of data at a migration destination according to the first exemplary embodiment.

FIG. 6 illustrates the result of migration of each item and each access right setting to each item, in a case where the data example of the migration-source document management system illustrated in FIG. 2 is migrated to the migration-destination document management system capable of setting an access right only in folder units, according to the exemplary embodiment of the present invention. The configuration and the access rights to the "team" folder, the "specifications" folder, the "note.txt" document, the "project management" folder, and the "schedule.xls" document are the same as those at the migration source. On the other hand, the "progress.xls" document immediately below the "project management" folder at the migration source is arranged immediately below the "progress.xls" sub-folder having the same name and access right as those at the migration source. More specifically, if the "progress.xls" document is accessed in the document management system at the data migration destination, the "progress.xls" document is managed with the access right set to the "progress.xls" sub-folder, so that the same access right as that of the migration-source document management system is required.

According to the present exemplary embodiment, even if data are migrated from the document management system capable of setting an access right in document units to the document management system capable of setting an access right only in folder units, an access management similar to that at the migration source can be realized in the document management system at the migration destination.

In a second exemplary embodiment of the present invention, in a case where there is a plurality of documents to which a unique access right is set in the document management system at the migration source, and the same unique access right is set to the plurality of documents, a single sub-folder is created in the document management system at the migration destination, and the plurality of documents is stored in the sub-folder. The shortcut to the document stored in the sub-folder is created in the original designated path. The system configuration of the second exemplary embodiment is similar to that of the first exemplary embodiment, so that the description thereof is omitted.

In the flow of the data migration process in the second exemplary embodiment, the flow, in which the data migration control unit 1002 delivers information about the analyzed access right, data to be migrated, and a path of the data to the data migration unit 1004 and instructs the data migration unit 1004 to migrate the data, is similar to that of the first exemplary embodiment. The data migration unit 1004 migrates the data and sets the access right according to the delivered information and the flow chart in FIG. 8.

Figure 8:
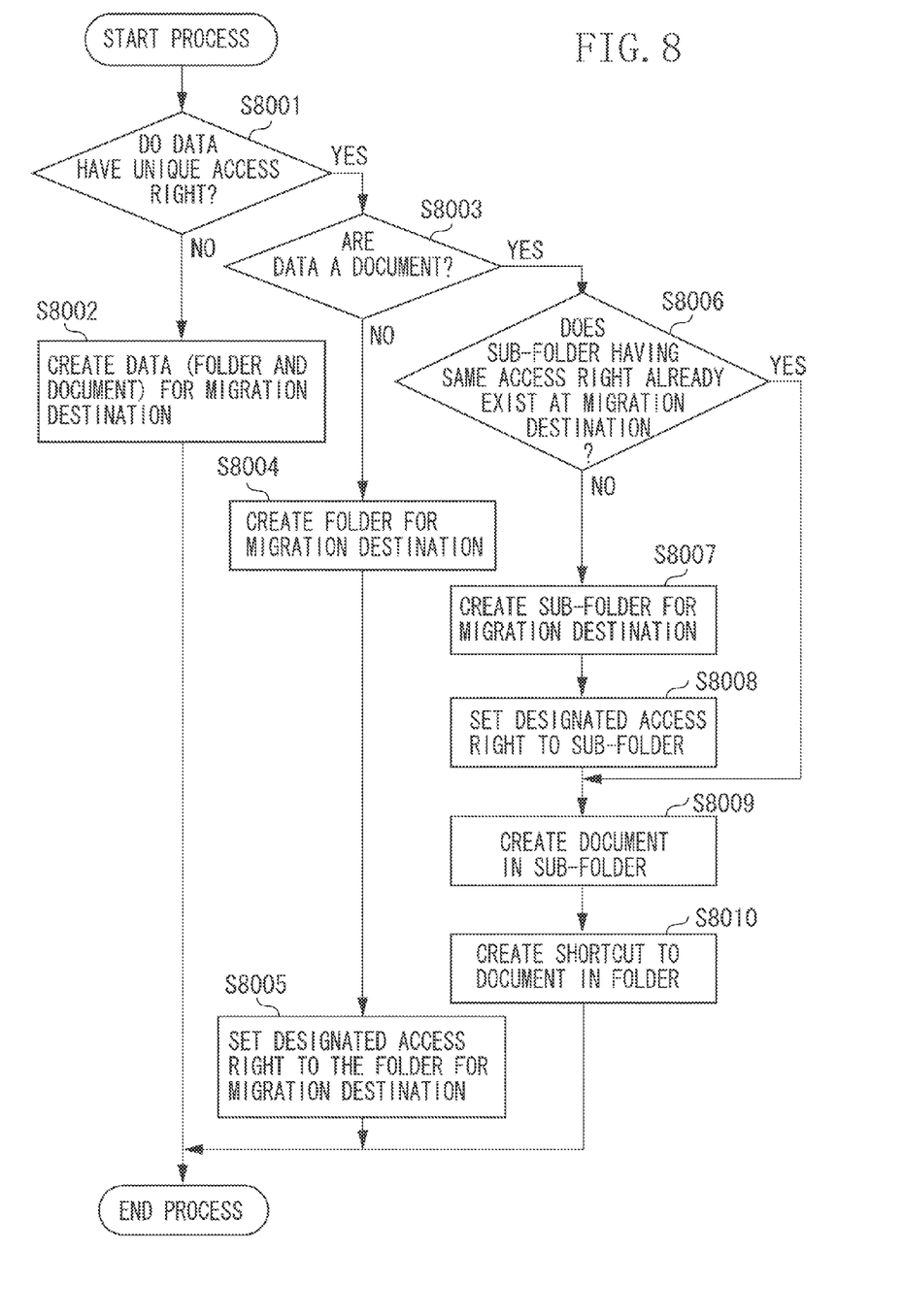
FIG. 8 is a flow chart of data migration according to the second exemplary embodiment.

In step 8001 in FIG. 8, the data migration unit 1004 determines whether the data to be migrated have a unique access right or inherit the access right to the higher-level folder based on the delivered information about the access right.

If the data migration unit 1004 determines that the data inherit the access right to the higher-level folder (NO in step 8001), then in step 8002, the data (a document or a folder) to be migrated are arranged in the designated path at the migration destination, and the processing is ended.

If the data migration unit 1004 determines that the data have the unique access right (YES in step 8001), in step 8003, the data migration unit 1004 determines whether the data to be migrated are a document or a folder.

If the data migration unit 1004 determines that the data to be migrated are a folder (NO in step 8003), then in step 8004, the data migration unit 1004 creates a folder having the same name in the designated path at the migration destination. In step 8005, the designated access right is set to the created folder, and the processing is ended.

If the data migration unit 1004 determines that the data to be migrated are a document (YES in step 8003), then in step 8006, the data migration unit 1004 confirms whether a sub-folder having the same access right already exists at the migration destination.

If the data migration unit 1004 determines that the sub-folder having the same access right does not exist (NO in step 8006), then in step 8007, the data migration unit 1004 creates a sub-folder under the name of the access right to the document data to be migrated in the designated path at the migration destination. In step 8009, the data migration unit 1004 creates a document in the created sub-folder. In step 8009, the data migration unit 1004 creates the shortcut to the document arranged in the sub-folder in the designated path (folder) at the migration destination, and the processing is ended.

If the data migration unit 1004 determines that the sub-folder having the same access right exists (YES in step 8006), the processing proceeds to step 8009 without creating a new sub-folder and the data migration unit 1004 arranges a document in the sub-folder with the same access right. In step 8010, the data migration unit 1004 creates the shortcut to the document arranged in the sub-folder in the designated path (folder) at the migration destination, and the processing is ended.

Figure 7:
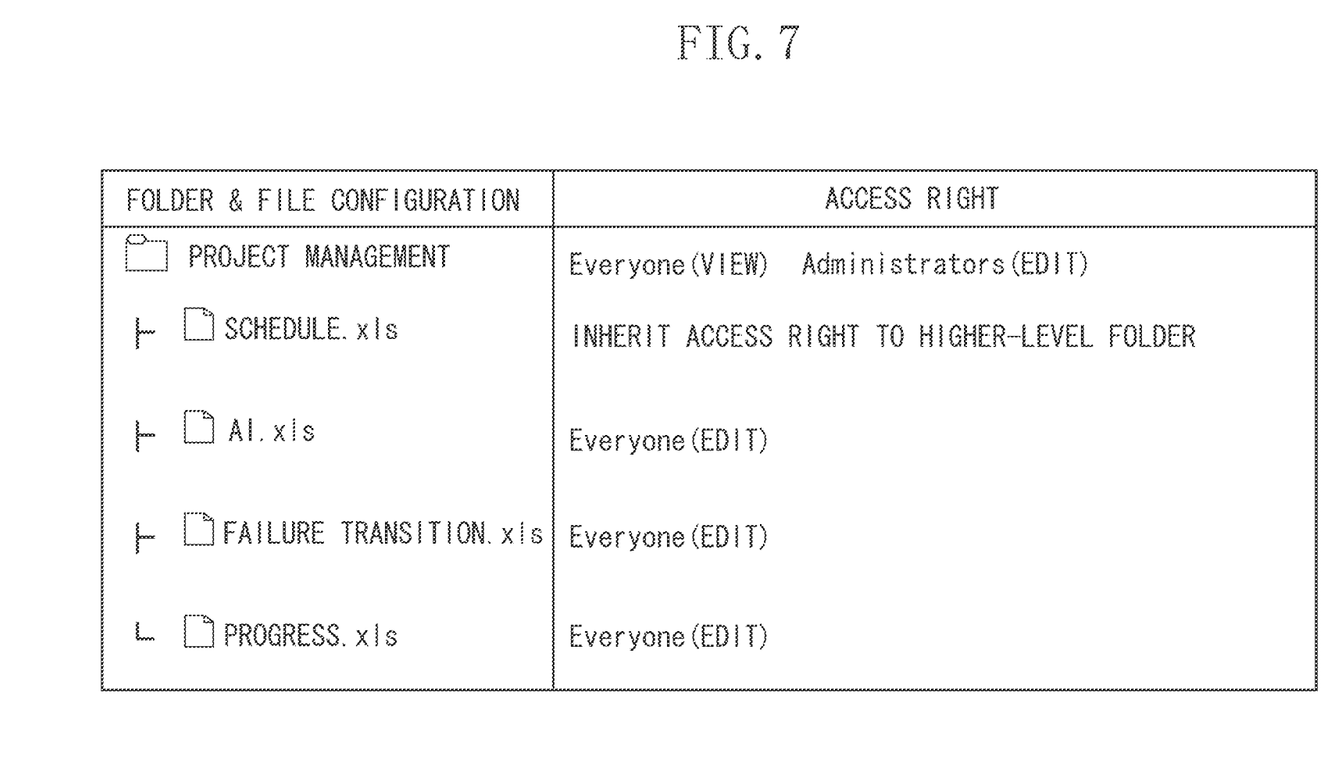
FIG. 7 illustrates an example of data at a migration source according to a second exemplary embodiment of the present invention.
Figure 9:
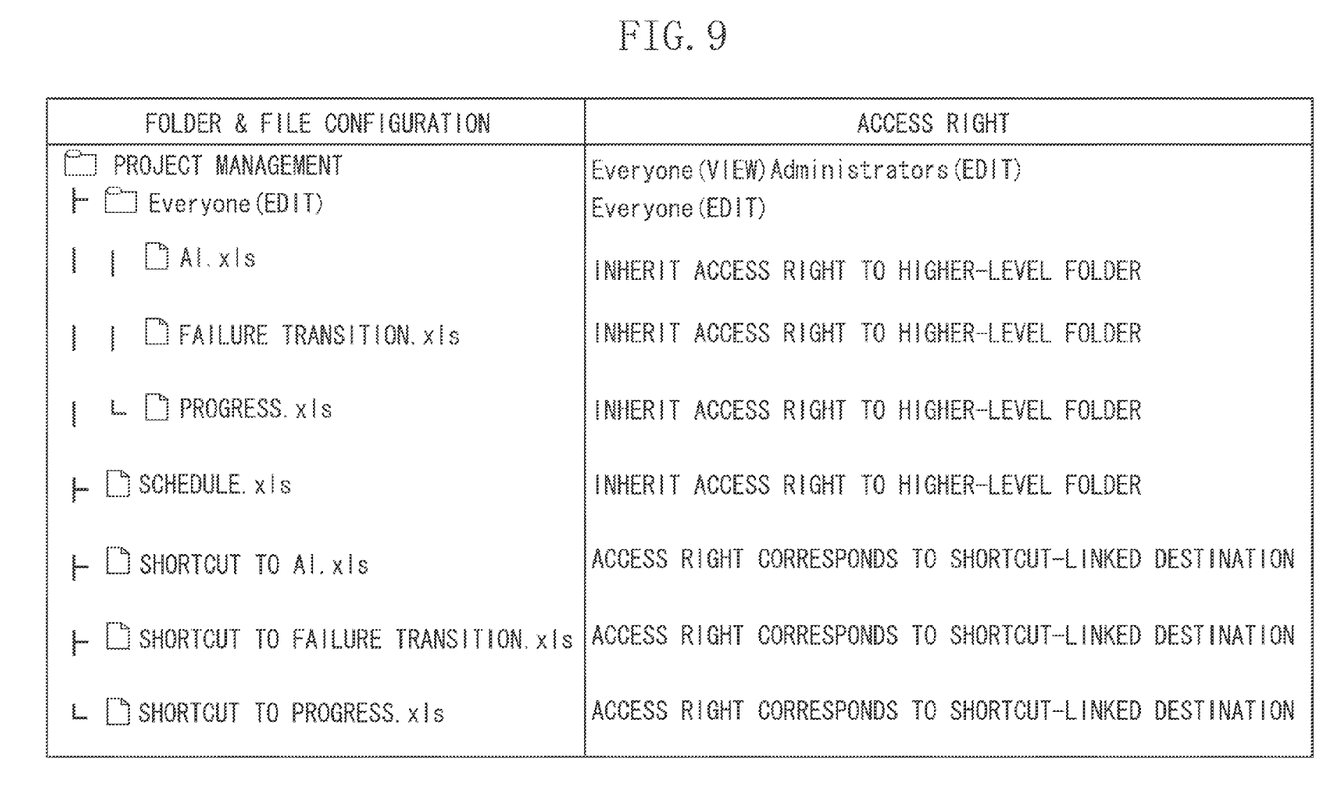
FIG. 9 illustrates an example of data at a migration destination according to the second exemplary embodiment.
Figure 10:
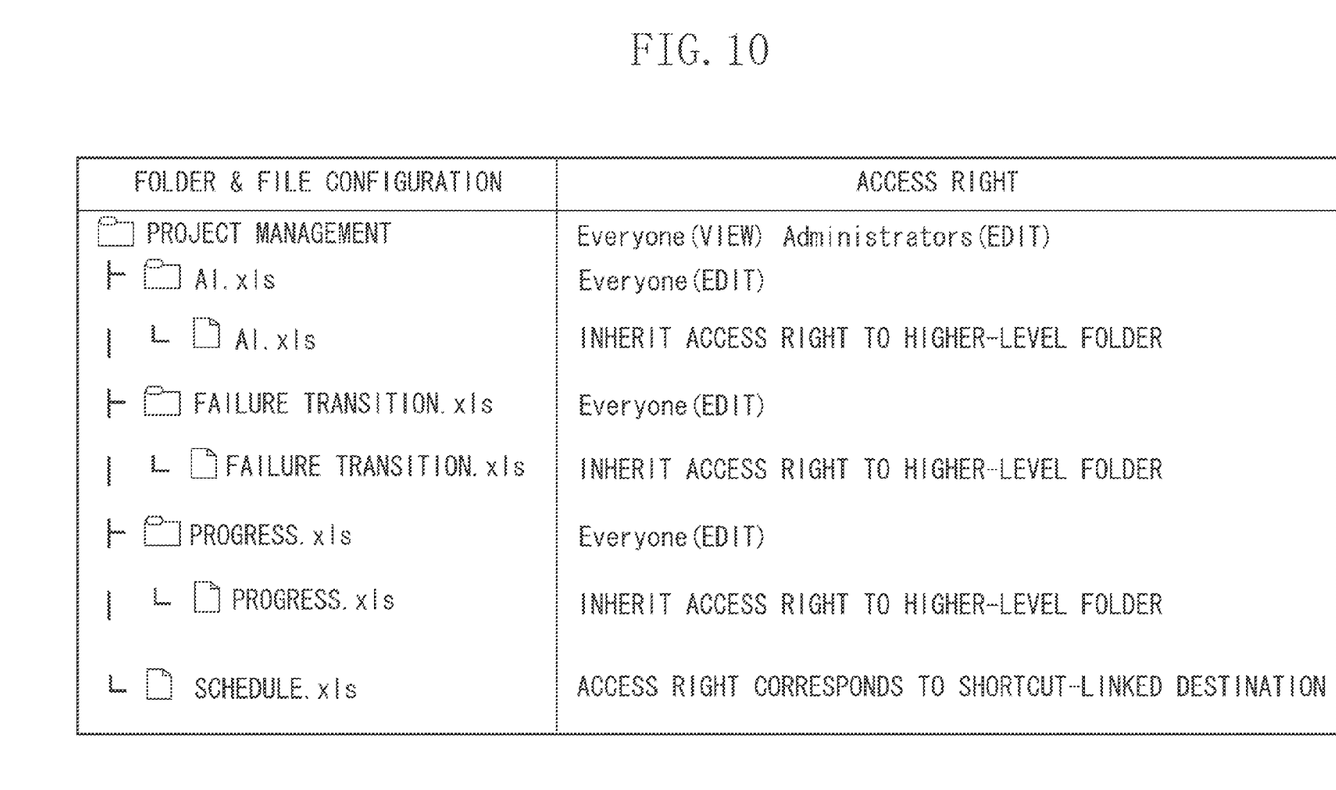
FIG. 10 illustrates an example of data at a migration destination according to the first exemplary embodiment.

FIG. 7 illustrates an example of data managed by the migration-source document management system capable of setting an access right in folder units or in document units. FIG. 9 illustrates results in which the data illustrated in FIG. 7 are migrated to the migration-destination document management system incapable of setting an access right in document units and capable of setting an access right only in folder units using the data migration process according to the second exemplary embodiment. FIG. 9 indicates each item (a folder and a document), and each access right set to each item in a case where the data are migrated to the document management system capable of setting an access right only in folder units. As illustrated in FIG. 9, the configuration and access rights to the "project management" folder and the "schedule.xls" document are the same as those at the migration source. On the other hand, an "AI.xls" document, a "failure transition.xls" document, and a "progress.xls" document immediately below the "project management" folder at the migration source are arranged immediately below the "Everyone (edit)" sub-folder having the same access right as the migration-source document. A shortcut to the "AI.xls" document, a shortcut to the "failure transition.xls" document, and a shortcut to the "progress.xls" document are arranged immediately below the "project management" folder.

According to the second exemplary embodiment, even if there is a plurality of documents to which a unique access right is set, each of the documents is to be stored in each of integrated sub-folders classified by access right, so that an access-right management after migration can be collectively performed. In other words, maintenance can be improved in the document management system at the migration destination, while achieving the access-right management, which is the same as that in the system at the migration source.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A data migration apparatus that migrates document data from a first document management system to a second document management system, wherein the first document management system is capable of setting an access right in document units and folder units, and wherein the second document management system is incapable of setting an access right in document units and capable of setting an access right in folder units, the data migration apparatus comprising:
   a determination unit configured to determine whether an access right, which is set in the first management system, to the document data inherits an access right to a higher-level folder or is unique to the document data;
   a sub-folder creation unit configured to create a sub-folder at a migration destination in the second document management system if the determination unit determines that the access right to the document data is unique to the document data, wherein an access right to the created sub-folder in the second document management system is the same as the access right, which is set in the first document management system, to the document data; and
   a document storage unit configured to store the document data in the sub-folder created by the sub-folder creation unit.

2. The data migration apparatus according to claim 1, wherein, if the determination unit determines that the access right to the document data inherits the access right to the higher-level folder, the document storage unit stores the document data in the higher-level folder which is migrated from the first document management system to the second document management system.

3. The data migration apparatus according to claim 1, further comprising a folder creation unit configured to create a folder in the second document management system if data to be migrated include a folder to which a unique access right is set, wherein an access right set to the folder created in the second document management system is the same as the unique access right.

4. The data migration apparatus according to claim 1, further comprising a shortcut creation unit configured to create a shortcut of the document data at the migration destination in the second document management system, the document data being stored in the sub-folder.

5. A data migration apparatus that migrates document data from a first document management system to a second document management system, wherein the first document management system is capable of setting an access right in document units and folder units, and wherein the second document management system is incapable of setting an access right in document units and capable of setting an access right in folder units, the data migration apparatus comprising:
   a determination unit configured to determine whether an access right, which is set in the first management system, to the document data inherits an access right to a higher-level folder or is unique to the document data;
   a sub-folder determination unit configured to determine whether a sub-folder to which a same access right as the access right unique to the document data is set exists at a migration destination in the second document management system, if the determination unit determines that the access right to the document data is unique to the document data;
   a sub-folder creation unit configured to create a sub-folder to which the same access right as the access right unique to the document data is set at the migration destination in the second document management system, if the sub-folder determination unit determines that the sub-folder to which the same access right as the access right unique to the document data is set does not exist at the migration destination in the second document management system; and a document storage unit configured to store the document data in the sub-folder created by the sub-folder creation unit if the sub-folder determination unit determines that the sub-folder to which the same access right as the access right unique to the document data is set does not exist at the migration destination in the second document management system, and to store the document data in the existing sub-folder if the sub-folder determination unit determines that the sub-folder to which the same access right as the access right unique to the document data is set exists at the migration destination in the second document management system.

6. The data migration apparatus according to claim 5, further comprising a shortcut creation unit configured to create a shortcut of the document data at the migration destination in the second document management system, the document data being stored in the sub-folder.

7. A data migration method that migrates document data from a first document management system to a second document management system, wherein the first document management system is capable of setting an access right in document units and folder units, and wherein the second document management system is incapable of setting an access right in document units and capable of setting an access right in folder units, the data migration method comprising:

determining whether an access right, which is set in the first management system, to the document data inherits an access right to a higher-level folder or is unique to the document data;

creating a sub-folder at a migration destination in the second document management system if the determining step determines that the access right to the document data is unique to the document data, wherein an access right to the created sub-folder in the second document management system is the same as the access right, which is set in the first document management system, to the document data; and storing the document data in the sub-folder created by the creating step.

8. The data migration method according to claim 7, wherein, if the determining step determines that the access right to the document data inherits the access right to the higher-level folder, the storing step stores the document data in the higher-level folder which is migrated from the first document management system to the second document management system.

9. The data migration apparatus method to claim 7, further comprising creating a folder in the second document management system if data to be migrated include a folder to which a unique access right is set, wherein an access right set to the folder created in the second document management system is the same as the unique access right.

10. The data migration method according to claim 7, further comprising creating a shortcut of the document data at the migration destination in the second document management system, the document data being stored in the sub-folder.

11. A data migration method that migrates document data from a first document management system to a second document management system, wherein the first document management system is capable of setting an access right in document units and folder units, and wherein the second document management system is incapable of setting an access right in document units and capable of setting an access right in folder units, the data migration method comprising:

determining whether an access right, which is set in the first management system, to the document data inherits an access right to a higher-level folder or is unique to the document data;

determining, by a sub-folder determination unit, whether a sub-folder to which a same access right as the access right unique to the document data is set exists at a migration destination in the second document management system, if the determining step determines that the access right to the document data is unique to the document data;

creating a sub-folder to which the same access right as the access right unique to the document data is set at the migration destination in the second document management system, if the sub-folder determination unit determines that the sub-folder to which the same access right as the access right unique to the document data is set does not exist at the migration destination in the second document management system; and storing the document data in the sub-folder created by the creating step if the sub-folder determination unit determines that the sub-folder to which the same access right as the access right unique to the document data is set does not exist at the migration destination in the second document management system, and to store the document data in the existing sub-folder if the sub-folder determination unit determines that the sub-folder to which the same access right as the access right unique to the document data is set exists at the migration destination in the second document management system.

12. The data migration method according to claim 11, further comprising creating a shortcut of the document data at the migration destination in the second document management system, the document data being stored in the sub-folder.

13. A non-transitory computer-readable storage medium storing a computer program that causes a computer to function as a data migration apparatus that migrates data from a first document management system capable of setting an access right in document units to a second document management system incapable of setting an access right in document units and capable of setting an access right in folder units, the computer program causing the computer to function as:

a determination unit configured to determine whether an access right, which is set in the first management system, to the document data inherits an access right to a higher-level folder or is unique to the document data;

a sub-folder creation unit configured to create a sub-folder at a migration destination in the second document management system if the determination unit determines that the access right to the document data is unique to the document data, wherein an access right to the created sub-folder in the second document management system is the same as the access right, which is set in the first document management system, to the document data; and a document storage unit configured to store the document data in the sub-folder created by the sub-folder creation unit.

14. A non-transitory computer-readable storage medium storing a computer program that causes a computer to function as a data migration apparatus that migrates data from a first document management system capable of setting an access right in document units to a second document management system incapable of setting an access right in document units and capable of setting an access right in folder units, the computer program causing the computer to function as:

a determination unit configured to determine whether an access right, which is set in the first management system, to the document data inherits an access right to a higher-level folder or is unique to the document data;

a sub-folder determination unit configured to determine whether a sub-folder to which a same access right as the access right unique to the document data is set exists at a migration destination in the second document management system, if the determination unit determines that the access right to the document data is unique to the document data;

a sub-folder creation unit configured to create a sub-folder to which the same access right as the access right unique to the document data is set at the migration destination in the second document management system, if the sub-folder determination unit determines that the sub-folder to which the same access right as the access right unique to the document data is set does not exist at the migration destination in the second document management system; and a document storage unit configured to store the document data in the sub-folder created by the sub-folder creation unit if the sub-folder determination unit determines that the sub-folder to which the same access right as the access right unique to the document data is set does not exist at the migration destination in the second document management system, and to store the document data in the existing sub-folder if the sub-folder determination unit determines that the sub-folder to which the same access right as the access right unique to the document data is set exists at the migration destination in the second document management system.

* * * * *